United States Patent [19]

Labadie et al.

[11] 4,124,876
[45] Nov. 7, 1978

[54] DUAL MICA CAPACITOR

[75] Inventors: Xavier R. Labadie, Fresnes; André J. Velte, Le Chesnay Parly, both of France

[73] Assignee: Societe Anonyme de Telecommunications, Paris, France

[21] Appl. No.: 843,312

[22] Filed: Oct. 18, 1977

[30] Foreign Application Priority Data

Oct. 22, 1976 [FR] France ................................ 76 31818

[51] Int. Cl.² .............................................. H01G 4/38
[52] U.S. Cl. .................................... 361/325; 361/307; 361/328; 361/329
[58] Field of Search ................. 361/307, 325, 328, 329

[56] References Cited

U.S. PATENT DOCUMENTS

| 2,262,791 | 11/1941 | Branstord | 361/325 |
| 3,229,173 | 1/1966 | McHugh | 361/307 X |

FOREIGN PATENT DOCUMENTS 662,042  8/1965  Belgium ..................... 361/328

Primary Examiner—E. A. Goldberg

[57] ABSTRACT

A mica capacitor is made of two elementary modular mica capacitors which can be of different values. The leads of the capacitor are placed between the two modular mica capacitors.

2 Claims, 1 Drawing Figure

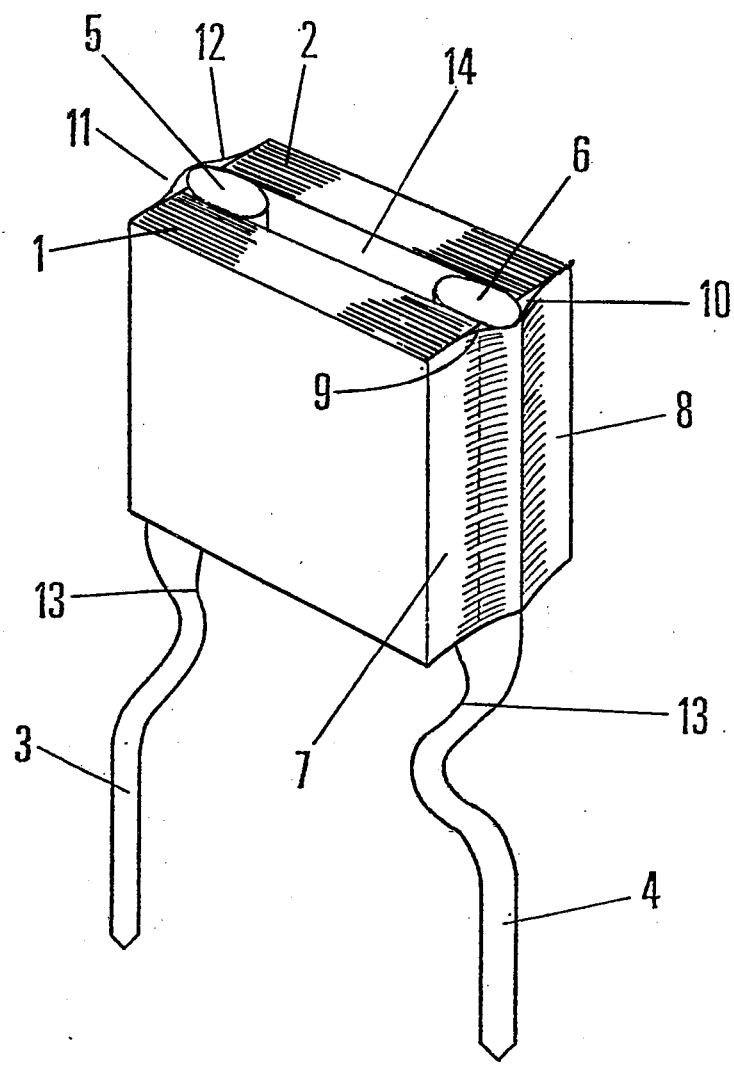

DUAL MICA CAPACITOR

CROSS REFERENCES TO RELATED APPLICATIONS

Applicants hereby make cross references to their French patent application No. PV 76 31818, filed Oct. 22, 1976 and claim priority thereunder following the provisions of 35 U.S.C. 119.

BACKGROUND OF THE INVENTION

1. Field of the Invention

The present invention concerns a mica capacitor derived from the paralleling of two elementary modular capacitors, so as to provide a capacitor component having a highly accurate value of capacitance and a high mechanical strength.

2. Description of the Prior Art

Capacitors have already been designed using stacked mica sheets, with coatings of electrically conductive material carefully deposited on each to form two electrodes. The number of stacked mica sheets and the form of the deposited conductive coatings determine the capacitive value of the capacitor.

According to the usual method, tabs or electrical terminal leads can then be soldered to opposed surfaces of the block formed by said stacked sheets, said surfaces being metallized and respectively connected to the conductive coatings forming the electrodes. A capacitor assembled in this way, on the one hand, does not exhibit very high mechanical strength and, on the other hand, provides a capacitive value which varies more or less from the one desired.

SUMMARY OF THE INVENTION

Accordingly, an object of this invention is to provide new and improved structural configuration consisting of two elementary modular capacitors, each of the standard type. Each elementary capacitor is a known block with stacked mica sheets and two metal coatings, each of such coatings being an electrode of electrically conductor material deposited on at least two substantially parallel opposed edges of the block.

In accordance with one aspect of this invention, the block of each elementary capacitor is connected in parallel to the block of the other elementary capacitor by means of the end portions of the two electrical terminal leads. The end portions are flattened and sandwiched between main opposed faces of the two elementary capacitor blocks, project outward slightly beyond said opposed edges which are covered by said electrode coatings, and are bounded in parallel to said opposed edges by soldering to said electrode coatings, whereby an intermediate space separates the two main opposed faces of the elementary capacitor blocks.

In accordance with an other aspect of this invention, both capacitive values $C_1$, $C_2$ of the two elementary capacitors are chosen within narrow ranges of complementary capacitive values, preferably on either side and equidistant from the half-value $C/2$ of the capacitor according to the invention. This prior selection permits capacitors having a capacitance C to be obtained with high accuracy while using elementary capacitors $C_1$ and $C_2$ of low accuracy, but carefully selected and matched. Thus, more specifically, the capacitive values $C_1$ and $C_2$ of the elementary capacitors of the capacitor having a capacitance C are selected and matched within narrow capacitance ranges such as:

$$C_1 = C/2 + x \pm \Delta x \text{ and } C_2 = C/2 - x \pm \Delta x$$

when $x$ is any capacitive value and $\Delta x$ represents a very small variation of $x$.

Furthermore, according to this invention, the capacitor C, in which the electrical terminal leads are flattened and sandwiched between the two elementary capacitors $C_1$ and $C_2$, exhibits a high mechanical strength due to its box shape. This a rugged component which resists well the various manipulations required for usage of the capacitor. Especially, the results of pull tests on its leads are very satisfactory.

BRIEF DESCRIPTION OF THE DRAWING

The above-mentioned and other objects of the invention will be better understood from the following description, given in connection with the accompanying drawings, in which the single FIGURE is a perspective view of one form of capacitor embodying the invention.

DESCRIPTION OF THE PREFERRED EMBODIMENT

This single FIGURE shows an embodiment example of capacitor embodying the invention and having a capacitive value C. It comprises two elementary modular capacitors, having capacitance $C_1$ and $C_2$ respectively, and placed in parallel such as $C_1 + C_2 = C$. Elementary capacitors $C_1$ and $C_2$, each of which is formed identical to the other in the embodiment illustrated, are substantially rectangular body blocks 1, 2, consisting of stacked mica sheets, for example, which are represented by small parallel lines on the top sections of blocks 1 and 2. Metal coatings or electrically conductive plates, not shown, are applied on the two vertical edges of the mica sheets of each block to form the electrodes of a elementary capacitor.

Electrical terminals or leads 3 and 4, for example cylindrical along their lower portion, are flattened along their upper portions 5 and 6 and sandwiched between the two blocks 1 and 2 of the elementary capacitors $C_1$ and $C_2$, so that the major portion of the flattened leads is situated between the two blocks 1 and 2 while a small portion of the leads 1 and 2 projects toward the outside between the two vertical metallized edges of blocks 1 and 2 of capacitors $C_1$ and $C_2$. Thus, the flattened upper portion 6 of lead 4 projects outward between the metallized coplanar vertical edges 7 and 8 connected respectively to the electrodes of identical polarity of the elementary capacitors $C_1$ and $C_2$. Two weld beads 9 and 10 secure the electrical and mechanical connections between the said lead 6 and the edges 7 and 8. The same holds true for the flattened upper portion 5 of lead 3 with respect to the two vertical edges opposite the edges 7 and 8 and not shown in the FIGURE, and to which it is connected by two weld beads 11 and 12.

By way of no-limiting example, leads 3 and 4 may be round wires 0.6 mm in diameter which are flattened above the level indicated by the dotted line 13, to a thickness of 0.15 mm. The two blocks 1 and 2 of elementary capacitors $C_1$ and $C_2$ are therefore separated by an intermediate space 14, between the two main faces of capacitors $C_1$ and $C_2$, of about 0.15 mm equal to the thickness of the upper flattened portions 5 and 6.

If the elementary capacitors $C_1$ and $C_2$ used are hermetically sealed, the capacitor C embodying the invention does not have to be encapsulated or given any protective covering, and the intermediate space 14 remains open.

In accordance with the invention, the capacitor due to its high electrical accuracy and mechanical strength, is especially suited for use on telecommunications circuit boards.

What we claim is:

1. A capacitor comprising two electrical terminal leads and two elementary capacitors, each capacitor having a rectangular body block of stacked mica sheets including two electrode coatings of electrical conductive material covering at least two substantially parallel opposite edges of said block, said block of one elementary capacitor being connected in parallel to said block of other elementary capacitor by means of the end portions of said electrical terminal leads, said end portions being flattened and sandwiched between two main opposed faces of said blocks, projecting outward slightly beyond said substantially parallel edges of said blocks, and each being bounded in parallel to said edges of said blocks by soldering to said electrode coatings, whereby an intermediate space separates said main opposed faces of said elementary capacitor blocks.

2. A capacitor as claimed in claim 1, wherein the capacitve values $C_1$ and $C_2$ of said elementary capacitors are selected and matched within narrow capacitance ranges such as:

$$C_1 = C/2 + x \pm \Delta x \text{ and } C_2 = C/2 - x \pm \Delta x$$

where $C$ is the capacitive value of said capacitor, $x$ is any capacitor value and $\Delta x$ represents a very small variation of $x$.

* * * * *